No. 625,565. Patented May 23, 1899.
E. D. KENDALL.
PROCESS OF TREATING GOLD OR SILVER ORES AND COMPOSITION OF MATTER FOR SAME PURPOSE.
(Application filed May 12, 1898.)
(No Model.)
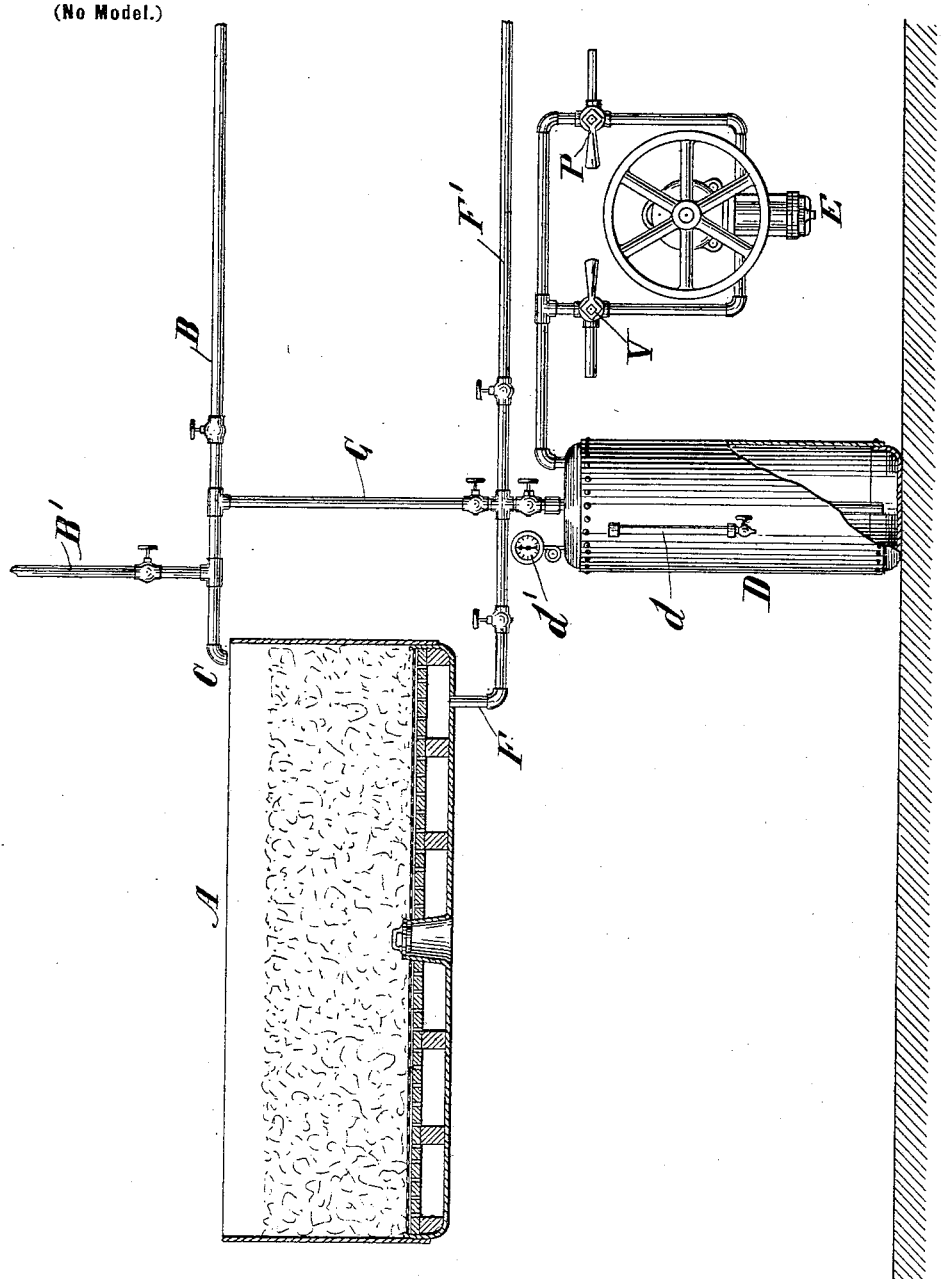
WITNESSES:
INVENTOR
E. D. Kendall.
BY
HIS ATTORNEY

UNITED STATES PATENT OFFICE.

EDWARD D. KENDALL, OF NEW YORK, N. Y., ASSIGNOR TO HIMSELF AND EDWARD N. DICKERSON, OF SAME PLACE.

PROCESS OF TREATING GOLD OR SILVER ORES AND COMPOSITION OF MATTER FOR SAME PURPOSE.

SPECIFICATION forming part of Letters Patent No. 625,565, dated May 23, 1899.

Application filed May 12, 1898. Serial No. 680,454. (No specimens.)

*To all whom it may concern:*

Be it known that I, EDWARD D. KENDALL, of the city of New York, borough of Brooklyn, in the county of Kings and State of New York, have invented a new and useful Improvement in Methods or Processes of Treating Gold or Silver Ores and a Composition of Matter for the Same Purpose, of which the following is a full, true, and exact description.

In carrying out my invention I first granulate or pulverize the ore and convey it into any suitable lixiviation-vat and there subject it to the leaching action of my composition, which is a chemical solution prepared by dissolving a suitable thiocyanate or thiocyanates—for example, ammonium thiocyanate or potassium thiocyanate—in water and adding to this solution water containing hydrogen dioxid or water holding in solution or in suspension well-known chemicals which will generate hydrogen dioxid—for example, barium dioxid and a suitable acid. I thoroughly saturate the ore with this composition and allow the mass to remain undisturbed a sufficient time and then partly open the outlet-valve of the lixiviation-vat and allow the solution to percolate slowly through the ore, in some instances pumping back the solution upon the ore, with or without the addition of hydrogen dioxid.

In the accompanying drawing, which is a view partly in section and partly in elevation, I have illustrated an apparatus for carrying out my process.

In said drawing, A represents a leaching-vat of usual form which is charged with pulverized ore. B represents a pipe which conducts a solution of thiocyanate or both thiocyanate and cyanid, and B' is a pipe for conducting a solution of hydrogen dioxid. These pipes are so arranged that the solutions will be commingled and discharged into the leaching-vat through an outlet C.

D represents a closed tank which is provided with a glass gage $d$ and a gage $d'$ for indicating in degrees either a vacuum or pressure within the tank. This tank is connected with the leaching-vat by means of a valve-pipe F and with the pipe B by means of a pipe G. The pipes B, B', and G are each provided with a valve or valves.

F' represents a pipe forming a continuation of the pipe F for conducting away the lixivium either from the vat A or the tank D.

E represents an air-pump communicating with the tank D and provided with the three-way cocks V and P, which may be so arranged that either a vacuum or pressure may be produced within the tank. With this arrangement it will be seen that the ore may be thoroughly saturated with the commingled solutions and allowed to remain undisturbed a sufficient time and then slowly percolate through the ores. If desired, in some instances the solution may be drawn into the tank D and then forced from the tank D through the pipe G to the pipe B and again into the leaching-vat. This may be done with or without the addition of either the thiocyanate or the hydrogen dioxid. When the ore has been sufficiently treated by chemical solutions, the lixivium is drawn off through the pipes F and F' to an appropriate apparatus, in which the precious metals may be obtained from the lixivium by electrolysis or other suitable means.

I do not confine myself to any exact proportions of the constituents of my composition nor to particular strengths of the solutions. These conditions may be varied within wide limits according to the natures of the different ores, especially with reference to the readiness or reluctance with which the ores yield their precious metals to the solution. In four hundred and fifty pounds of water I may dissolve six pounds of ammonium thiocyanate and add to this fifty pounds of water containing six pounds of commercial dilute hydrogen dioxid or the equivalent of this quantity of hydrogen dioxid of hydrogen-dioxid-producing chemicals, or I may add a smaller quantity of the dioxid and another portion later. The addition of a cyanid to the solution is no departure from my invention. In certain instances I have treated ores with my composition containing also potassium cyanid. In this case I should use in the previous solution, say, four hundred and fifty pounds of water and dissolve in it one pound of ammonium thiocyanate and three pounds of potassium cyanid, and add to this fifty pounds of water containing three pounds of commercial dilute hydrogen dioxid or the equivalent of this quantity of the hydrogen dioxid of hydrogen-dioxid-producing chemicals.

The application of heat is no departure from my invention. In warm weather this is a disadvantage; but under exposure to excessive cold the ore or the water with which the solution is to be prepared may be advantageously warmed.

When the chemicals used in this process are in dilute solution, as in treating ores, there is no formation of precipitate or coloration to indicate the nature of the reactions which take place. In concentrated solution the chemicals react to produce a proportionately small quantity of a yellow precipitate, which is probably perthiocyanogen. When the ore has been subjected to the action of the chemical solution a sufficient length of time, I draw off the lixivium or allow it to drain away from the ore and wash the ore with a limited quantity of water and conduct the lixivium and the first portions of the wash-water (the latter portions being used in the preparation of fresh chemical solution) to any suitable receptacle preparatory to recovering the precious metals from the liquid by electrolysis or other practicable means.

What I claim as my invention, and desire to secure by Letters Patent, is—

1. The herein-described process of treating ores or other bodies for the extraction of precious metals, which consists in treating them with an aqueous solution containing a thiocyanate and hydrogen dioxid, substantially as described.

2. The herein-described composition of matter to be used for the extraction of precious metals from ores, tailings or other bodies, consisting of a suitable thiocyanate and hydrogen dioxid in watery solution, substantially as described.

In testimony whereof I have signed my name to this specification in the presence of two subscribing witnesses.

EDWARD D. KENDALL.

Witnesses:
H. COUTANT,
D. W. MAXON.